United States Patent Office 3,352,378
Patented Nov. 14, 1967

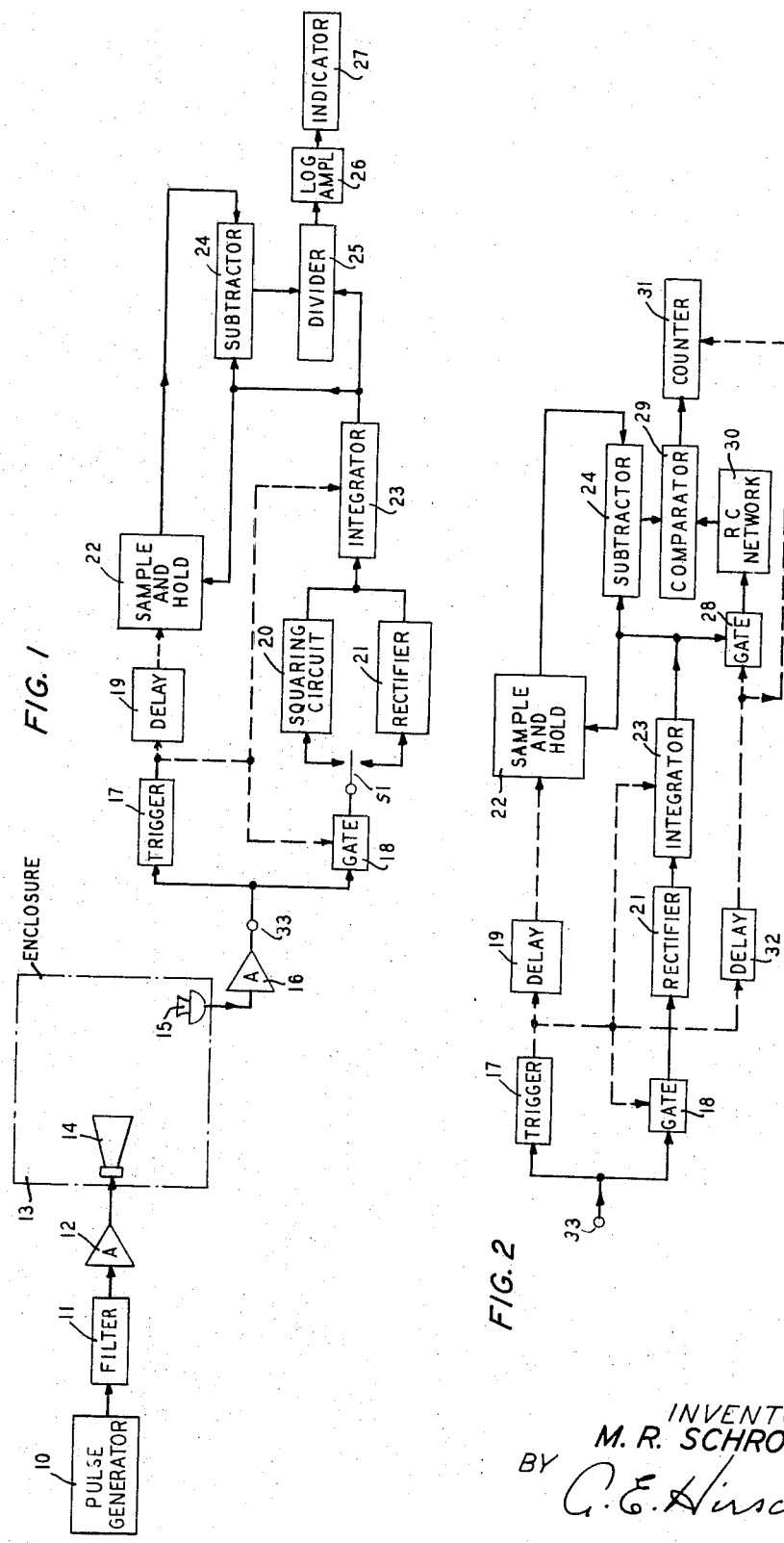

3,352,378
APPARATUS FOR AND METHOD OF DETERMINING THE ACOUSTICAL REVERBERATION TIME OF AN ENCLOSURE
Manfred R. Schroeder, Gillette, N.J., assignor to Bell Telephone Laboratories Incorporated, New York, N.Y., a corporation of New York
Filed Mar. 16, 1966, Ser. No. 534,907
11 Claims. (Cl. 181—0.5)

ABSTRACT OF THE DISCLOSURE

The use of decay curves in determining the acoustical properties of an enclosure has greatly facilitated the design of auditoriums, concert halls and other types of rooms. Theoretically, a decay curve should reveal certain important acoustical properties of an enclosure such as the reverberation time and the initial decay rate. Decay curves obtained, however, from actual experiments fail to reveal, clearly, the acoustical properties desired because of random irregularities that appear in such curves. This deficiency is overcome by generating an appropriate excitation signal and processing this signal to develop a signal representative of the "ensemble average" over infinitely many decay curves. This representative signal is further processed to develop a signal which is unequivocally related to the initial slope of the decay curve of the enclosure and thus to the reverberation time thereof.

---

This invention pertains to the determination of the response of a system to an applied excitation signal and, more particularly, to the determination of the acoustical reverberation time of an enclosure.

In the acoustic design of enclosures such as auditoriums, concert halls, and other types of rooms, it is necessary to ascertain precisely a number of different acoustic properties. One of the most useful techniques for determining several of these acoustic properties is to obtain so-called decay curves for the enclosure under study. Such curves are obtained by generating a selected sound signal at one point in the enclosure until the sound pressure level builds up to a desired level, following which the sound excitation signal is stopped and the decay of the signal received at another selected point in the enclosure is plotted as a function of time to produce the decay curve. The details of this process are given in several well-known texts exemplified by that of L. L. Beranek, entitled, "Acoustic Measurements," Chap. 18 (1949).

Theoretically, a decay curve should reveal several important properties of the enclosure. For example, one of the best known acoustic properties is reverberation time, which may be determined by measuring the length of time required for the sound pressure level to decay 60 decibels from its steady state value. Another important characteristic is the initial decay rate, since this rate is indicative of the reverberation time of the enclosure.

In practice, however, decay curves obtained from actual experiments often fail to reveal clearly the acoustic properties described above because of random irregularities or fluctuations that appear in such curves. When random noise is used as an excitation signal, part of the reason for these fluctuations is attributable to randomness in the initial amplitudes and phase angles of the noise frequency components from trial to trial; however, similar irregularities appear when other signals such as warble tones are used to excite the enclosure. As a result, different decay curves are obtained, and thus different reverberation times determined, under identical physical conditions. Therefore, despite identical transmitting and receiving positions, random fluctuations within the same enclosure cause each curve to have a different variation with time. Consequently, the random fluctuations that appear in the different decay curves make the accurate and reproducible measurement of reverberation time a difficult if not insuperable task.

It is well known, of course, that a relatively accurate measurement of reverberation time may be obtained by plotting many decay curves under identical physical conditions and averaging the individual reverberation times of the various curves. It is also well known that the initial decay rate is an accurate indicator of reverberation time. However, in addition to the obvious inefficiency of a procedure that requires the plotting of many decay curves and the averaging of many individual initial decay rates derived from the plotted curves, such a procedure does little to remove random fluctuations that mask the initial decay rate.

In the present invention, it is recognized that the ideal solution for removing random fluctuations from decay curves and thus from the measurement of reverberation time would be to average a sufficiently large number of the decay curves themselves to obtain a single "ensemble average" decay curve. It is further recognized in the present invention that there is a practical, realizable equivalent to this ideal solution in which by generating an appropriate excitation signal and by properly processing the received sound signal there is obtained a signal that is representative of the ensemble average over infinitely many decay curves. Therefore, the initial decay rate and, of course, the reverberation time may be determined in an accurate and reproducible manner. Specifically, it has been determined that the ensemble average of infinitely many received signals, each raised to the second power, is identical to a certain single integral of the impulse response of the enclosure, raised to the second power.

In accordance with the present invention, a signal representative of the impulse response of an enclosure is obtained by exciting the enclosure with a relatively brief impulse containing energy in the frequency range of interest. The detected representative signal is raised to the second power and integrated. After a predetermined interval of time has elapsed the value of this integrated signal is sampled and stored. A signal proportional to the difference between this stored signal and the "running," i.e., instantaneous, integral of the squared impulse response is developed. In accordance with the principles of this invention, it is shown that a signal proportional to the ratio of this difference signal and the running integral of the squared impulse response is unequivocally related to the initial slope of the decay curve of the enclosure and thus to the reverberation time thereof. An indicator, for example a meter responsive to this ratio signal, will therefore provide an indication of the reverberation time of the enclosure, directly, free from the random fluctuations discussed above. Furthermore, the reverberation time determined in this manner is equivalent to that which would be determined from the ensemble average of infinitely many decay curves.

The invention may be more fully understood from the following description of the illustrative embodiments thereof taken in connection with the appended drawings, in which:

FIG. 1 is a block schematic diagram illustrating apparatus for determining the reverberation time of an enclosure in accordance with the principles of this invention; and FIG. 2 is a block schematic diagram showing alternative apparatus for determining the reverberation time of an enclosure.

*Theoretical considerations*

In my copending application Ser. No. 417,364, filed

Dec. 10, 1964, entitled "Method of and Apparatus for Measuring Ensemble Averages and Decay Curves," now issued as Patent 3,270,833 on Sept. 6, 1966, it was shown that the ensemble average of infinitely many squared received signals, $<s^2(t)>$, is proportional to a selected integral of the squared impulse response, $r(x)$, of an entire enclosure system including a bandpass filter, amplifiers, and transducers connected in series with the enclosure. This relationship may be expressed analytically as:

$$<s^2(t)> = N \int_t^\infty r^2(x)dx \qquad (1)$$

therefore, $$<s^2(0)> = N \int_0^\infty r^2(x)dx \qquad (2)$$

and $$<s^2(\tau)> = N \int_\tau^\infty r^2(x)dx \qquad (3)$$

The integral of the squared impulse response, $r^2(x)$, of the enclosure may be expressed:

$$\int_0^t r^2(x)dx \qquad (4)$$

Also it may be shown that $$\int_0^\tau r^2(x)dx = \int_0^\infty r^2(x)dx - \int_\tau^\infty r^2(x)dx \qquad (5)$$

which is equivalent to the difference of:

$$<s^2(0)> - <s^2(\tau)> \qquad (6)$$

It therefore follows that the expression $$\frac{\int_0^\infty r^2(x)dx - \int_0^\tau r^2(x)dx}{\int_0^\infty r^2(x)dx} \qquad (7)$$

is equivalent to the ratio $$\frac{<s^2(\tau)>}{<s^2(0)>} \qquad (8)$$

The initial decay rate or slope, $m$, of the "ensemble average" decay curve plotted on a logarithmic scale is equal to:

$$m = \frac{10 \log <s^2(t_2)> - 10 \log <s^2(t_1)>}{t_2 - t_1} \qquad (9)$$

If the time differential, $t_2 - t_1$, is selected to be equal to $\tau$ and the time $t_1$ corresponds to the steady state value, $<s^2(0)>$, of an energized enclosure, then the initial slope $m$ is equal to:

$$m = \frac{10 \log \frac{<s^2(\tau)>}{<s^2(0)>}}{\tau} \text{ db/sec} \qquad (10)$$

The elapsed time, $T_{60}$, for the ensemble average decay curve to decrease 60 db may therefore be determined by the following expression:

$$60 \text{ db} = m \cdot T_{60} \qquad (11)$$

Therefore the reverberation time, $T_{60}$, is equal to:

$$T_{60} = \frac{60\tau}{10 \log \frac{<s^2(\tau)>}{<s^2(0)>}} \qquad (12)$$

Thus it has been shown in accordance with the principles of this invention, that the reverberation time of an enclosure is inversely proportional to the ratio defined by Equations 7 and 8, respectively.

Alternatively, in accordance with the principles of this invention, if a signal proportional to the steady state value, $<s^2(0)>$, is stored in a network having a time constant, RC, the time, $\theta$, for the stored signal to decay to a value equivalent to $<s^2(\tau)>$ may be determined by the following:

$$[<s^2(0)>] \epsilon^{-\frac{\theta}{RC}} = <s^2(\tau)> \qquad (13)$$

and $$\epsilon^{-\frac{\theta}{RC}} = \frac{<s^2(\tau)>}{<s^2(0)>} \qquad (14)$$

If the logarithm to the base 10 of the expression of Equation 14 is taken then $$-\frac{\theta}{TC} = [\ln 10] \log \frac{<s^2(\tau)>}{<s^2(0)>} \qquad (15)$$

Substituting this expression into Equation 12, it may be shown that $T_{60}$, the reverberating time of the enclosure, is inversely proportional to the time $\theta$ as follows:

$$T_{60} = k/\theta \qquad (16)$$

where $k$ equals a constant of proportionality and $\theta$ is equal to the time taken for the stored signal to decay to a value $<s^2(\tau)>$.

Thus, in accordance with the foregoing principles, the reverberation time of an enclosure may be directly determined in an accurate and reproducible manner free from inherent random fluctuations.

*Apparatus*

Apparatus for obtaining a direct measurement of the reverberation time of an enclosure based on the ensemble average of infinitely many squared noise decay signals, in accordance with Equation 12, is shown in FIG. 1. Illustrated is apparatus in which the input and output points of an enclosure system are defined to include filter 11, amplifier 12, loudspeaker 14, enclosure 13, microphone 15 and amplifier 16. An output signal representative of the impulse response of this ssytem is obtained at the output terminal 33 of amplifier 16 by applying a single relatively brief pulse, having a sufficiently broad spectrum, from pulse generator 10 to the input terminal of filter 11. Filter 11 may include a plurality of selectively actuated parallel connected bandpass filters as disclosed in my above-cited copending application.

The signal radiated into enclosure 13 is altered by the characteristic of the enclosure to produce at a second selected position within enclosure 13 a received signal which, after detection by microphone 15 and passage through amplifier 16, is representative of the impulse response of the enclosure, denoted $r(x)$, in the frequency range of interest. This representative signal is applied via terminal 33 to trigger circuit 17 which, responsive thereto, generates a pulse signal which activates transmission gate 18, pulse delay network 19, and resets integrator 23. The impulse response signal, $r(x)$, is conveyed by gate 18 to squaring circuit 20, assuming that switch S1 is operatively connected thereto. The squared signal is integrated by integrator 23 which develops a running integral signal proportional to Equation 4. After a predetermined interval of time, $\tau$, which may be of the order of .05 sec to .50 sec, the pulse which energized network 19 appears at the output thereof and activates sample and hold network 22. Thus, a signal proportional to the integral of the squared impulse response of the enclosure between a time 0 and a time $\tau$, corresponding to Equation 5, is stored in network 22.

After the lapse of approximately a second, the running integral signal appearing at the output of integrator 23 differs insignificantly from the integral expressed as Equation 2. This signal and the stored signal of network 22 are supplied to subtractor 24 which develops a signal proportional to their difference. The difference signal and the output signal of integrator 23 is applied to divider 25 which develops a signal proportional to the ratio of the two applied signals. The signal output of divider 25 therefore corresponds to Equation 7. Logarithmic amplifier 26 develops a signal proportional to the logarithm of the ratio. Thus, the output signal of amplifier 26 is inversely proportional to the reverberation time, $T_{60}$, as shown by Equation 12. Indicator 27, for example a meter, may be simply calibrated to read directly the reverberation time. Indeed the function performed by amplifier 26 may be incorporated into the calibration of indicator 27.

It has been found that the results obtained by the practice of this invention more closely approximate the "subjective reverberancy" of an enclosure if a rectifier is used instead of a squaring circuit. Thus, as shown in FIG. 1, switch S1 may be operatively connected to rectifier 21, which may be a full-wave or half-wave rectifier of any well-known type. It is believed that a more satisfactory subjective result is obtained because this method of signal processing more closely approximates the actual hearing mechanism of the human ear.

An alternative embodiment of the present invention is illustrated in FIG. 2. Input terminal 33 corresponds to the same designated terminal of FIG. 1. Identical components bear the same numerical designation. As discussed above, a signal which is representative of the impulse response of an enclosure 13 energizes trigger circuit 17 which activates transmission gate 18, delay network 19, and resets integrator 23. A rectifier 21 is shown in FIG. 2, but, as discussed above, a squaring circuit may be utilized. After an interval of time, $\tau$, corresponding to the delay of network 19, the integrated signal appearing at the output of integrator 23 is sampled and stored in network 22. A difference signal is formed by subtractor 24 which corresponds to the numerator of Equation 7 and which is identical to $<s^2(\tau)>$.

The pulse signal developed by trigger circuit 17 also activates a delay network 32 which, after an interval of time of approximately one second, activates transmission gate 28. Thus the output of integrator 23 is applied via gate 28 to RC network 30. The applied signal corresponds to $<s^2(0)>$ as defined by Equation 2. (After a second has elapsed the value of this integral cannot be practically distinguished from its value at $t=\infty$.) Simultaneously with the application of the integrated signal, corresponding to $<s^2(0)>$, to network 30, counter 31, which may be a timing network or a clock, is activated. The stored signal in network 30 decays exponentially in accordance with Equation 13. The decaying signal and the output of subtractor 24 are applied to comparator network 29. When the two applied signals are identical, a signal is developed which stops counter 31. The time elapsed, $\theta$, before counter 31 is deactivated, is inversely proportional to the reverberation time, $T_{60}$, as shown by Equation 16. Counter 31 may be easily calibrated to present an indication of reverberation time directly.

All of the component parts shown and described herein are conventional and may be of any type well known to those skilled in the art.

If desired, the enclosure system may be considered to include only the enclosure 13 itself in which case the received signal at a point within the enclosure represents the impulse response thereof. In order for the received signal to represent the impulse response, it is necessary to excite the enclosure with a relatively brief impulse of acoustic energy; for example a pistol shot, a clap or some other sound burst having a relatively short duration and substantial energy over a relatively wide frequency range. A technique similar to that disclosed in my above-cited copending application may be utilized for this purpose.

Although this invention has been described in terms of measuring the reverberation time of an enclosure, it is to be understood that the application of the principles of this invention is not limited to acoustics but includes other measurements in which excitation by noise or other sounds produce random fluctuations which tend to mask the response characteristics of the system being analyzed. In addition, it is to be understood that the above-described embodiments are merely illustrative of the numerous arrangements that may be devised by those skilled in the art without departing from the scope and spirit of the invention.

What is claimed is:
1. Apparatus for measuring automatically the reverberation time of an enclosures which comprises:
   a source of an impulse of energy having a predetermined frequency range and a relatively short time duration,
   means for exciting said enclosure with said impulse of energy at a first predetermined point,
   means for detecting at a second predetermined point within said enclosure an output signal representative of the impulse response of said enclosure,
   means for selectively processing said output signal,
   means for developing a signal which is the instantaneous integral of said processed signal,
   means for sampling and storing said integrated signal after a predetermined interval of time has elapsed,
   means for developing a signal proportional to the difference of said stored signal and the instantaneous integral of said processed signal,
   and means responsive to said difference signal and the instantaneous integral of said processed signal for developing a signal indicative of the reverberation time of said enclosure.
2. Apparatus as defined in claim 1 wherein said means for selectively processing said output signal comprises means for raising said output signal to the second power to produce a squared signal.
3. Apparatus as defined in claim 1 wherein said means for selectively processing said output signal comprises means for rectifying said signal.
4. Apparatus as defined in claim 1 wherein said means for sampling and storing said integrated signal after a predetermined interval of time has elapsed comprises:
   delay means for delaying an applied pulse for a predetermined interval of time,
   sample and hold means responsive to said delayed pulse,
   and means responsive to said detected output signal for generating said applied pulse.
5. Apparatus as defined in claim 1 wherein said means for developing a signal indicative of said reverberation time comprises:
   means for developing a signal proportional to the ratio of said difference signal and the instantaneous integral of said processed signal,
   means for developing a signal proportional to the logarithm of said ratio signal,
   and calibrated meter means responsive to said proportional logarithmic signal for indicating the reverberation time of said enclosure.
6. Apparatus as defined in claim 1 wherein said means for developing a signal indicative of said reverberation time comprises:
   means having a predetermined signal decay characteristic for storing an applied signal,
   means for applying to said storage means at a predetermined time a signal proportional to the instantaneous integral of said processed signal,
   means responsive to said stored signal and said difference signal for generating a signal when said stored signal decays to a value identical to that of said difference signal,
   and means responsive to said generated signal for indicating the interval of time between the application of said signal to said storage means and the generation of said signal.
7. The method of determining the reverberation time of an enclosure which comprises the steps of:
   introducing a relatively brief impulse of energy having a spectrum covering a predetermined frequency range into said enclosure at a first selected point, converting the sound decay due to said impulse at a second selected point within said enclosure into an electrical wave, processing said electrical wave to develop a first electrical signal proportional to the running integral of the squared amplitude of said electrical wave, storing said first electrical signal after a predetermined interval of time has elapsed to develop a second electrical signal proportional to the integral of the squared impulse response of said enclosure for the period of said predetermined interval of time, computing the difference between said first electrical signal and said second electrical signal to obtain a proportional third electrical signal, and computing the quotient of said third electrical signal and said first electrical signal.

8. In a system for computing automatically the reverberation time of an enclosure, the combination that comprises:

means for radiating at a first selected point within said enclosure a relatively brief impulse of acoustic energy having a predetermined frequency range, means for detecting at a second selected point within said enclosure a first signal proportional to the impulse response of said enclosure, switching means for selectively applying said first signal to one of two subpaths wherein the first one of said subpaths includes rectifying means and the second one of said subpaths includes squaring means, means responsive to a selected one of said subpaths for integrating a signal conveyed thereby, means for developing a signal proportional to the difference between the value of said integrated signal a predetermined time after the detection of said first signal and the value of said integrated signal subsequent in time, and means responsive to said difference signal and said integrated signal for developing a signal proportional to the reverberation time of said enclosure.

9. Apparatus as defined in claim 8 wherein said means for developing a signal proportional to the reverberation time of said enclosure comprises:

means for developing a signal proportional to the ratio of said difference signal and said integrated signal, and means for developing a signal proportional to the logarithm of said ratio signal.

10. Apparatus as defined in claim 8 wherein said means for developing a signal proportional to the reverberation time of said enclosure comprises:

means having a predetermined signal decay characteristic for storing an applied signal, means for applying a signal proportional to the value of said integrated signal to said storage means, means responsive to said stored signal and said difference signal for generating a signal when said stored signal decays to a value identical to that of said difference signal, and means responsive to said generated signal for indicating the lapse of time between the application of said signal to said storage means and the generation of said identity signal.

11. Apparatus for determining the reverberation time of an energized enclosure comprising:

means for energizing said enclosure with a brief impulse of energy, means for developing an electrical signal proportional to the impulse response of said enclosure, means for rectifying said signal, means for integrating said rectified signal, means for sampling and storing said integrated signal after a preselected interval of time has elapsed, means for developing a signal proportional to the difference of said stored signal and the instantaneous integral of the rectified impulse response of said enclosure, means for developing a signal proportional to the ratio of said difference signal and said instantaneous integral, and means for indicating the value of said ratio signal.

References Cited

UNITED STATES PATENTS 3,270,833   9/1966   Schroeder _____ 181—.5

RODNEY D. BENNETT, *Primary Examiner.*

SAMUEL FEINBERG, *Examiner.*

M. F. HUBLER, *Assistant Examiner.*